Aug. 18, 1936.    R. C. BAXTER ET AL    2,051,126
NAPHTHA CLEANING PLANT
Filed Jan. 3, 1935    2 Sheets-Sheet 1
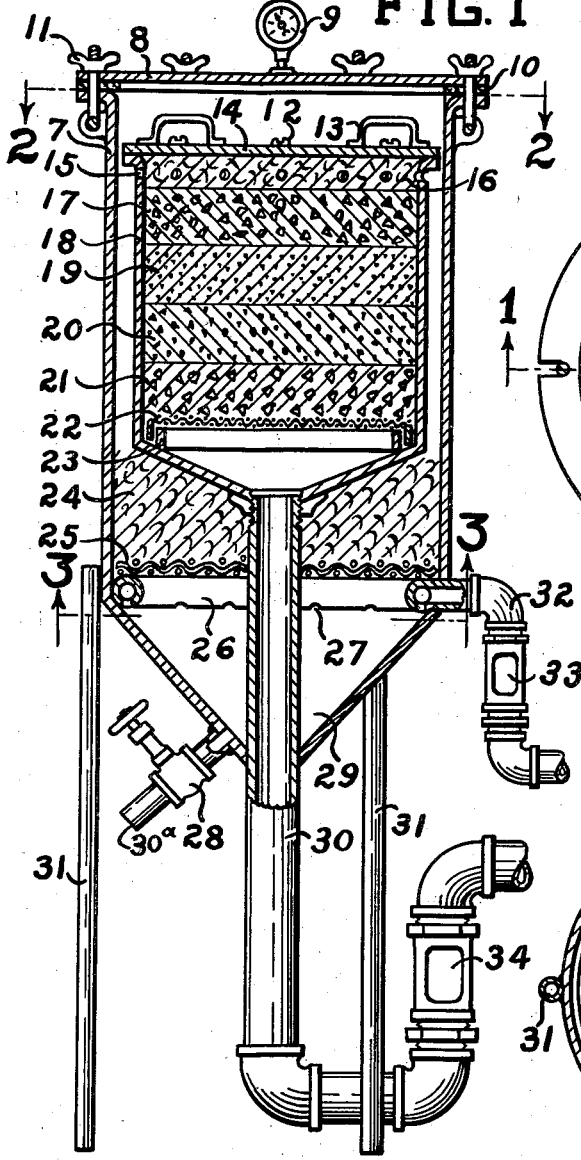
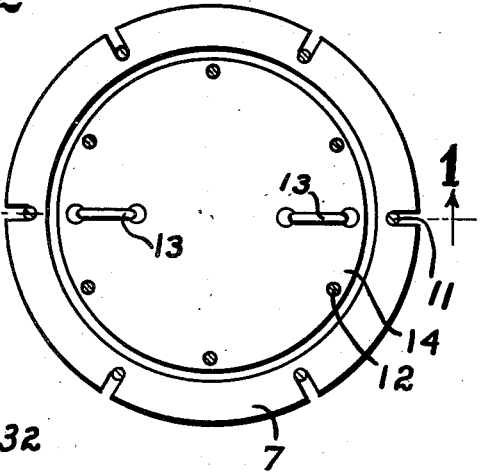
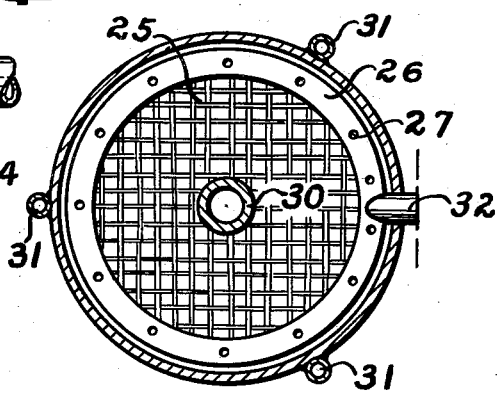
R. C. Baxter
L. D. Stewart
INVENTORS
BY *Van Buren Hillyard*
ATTORNEY.

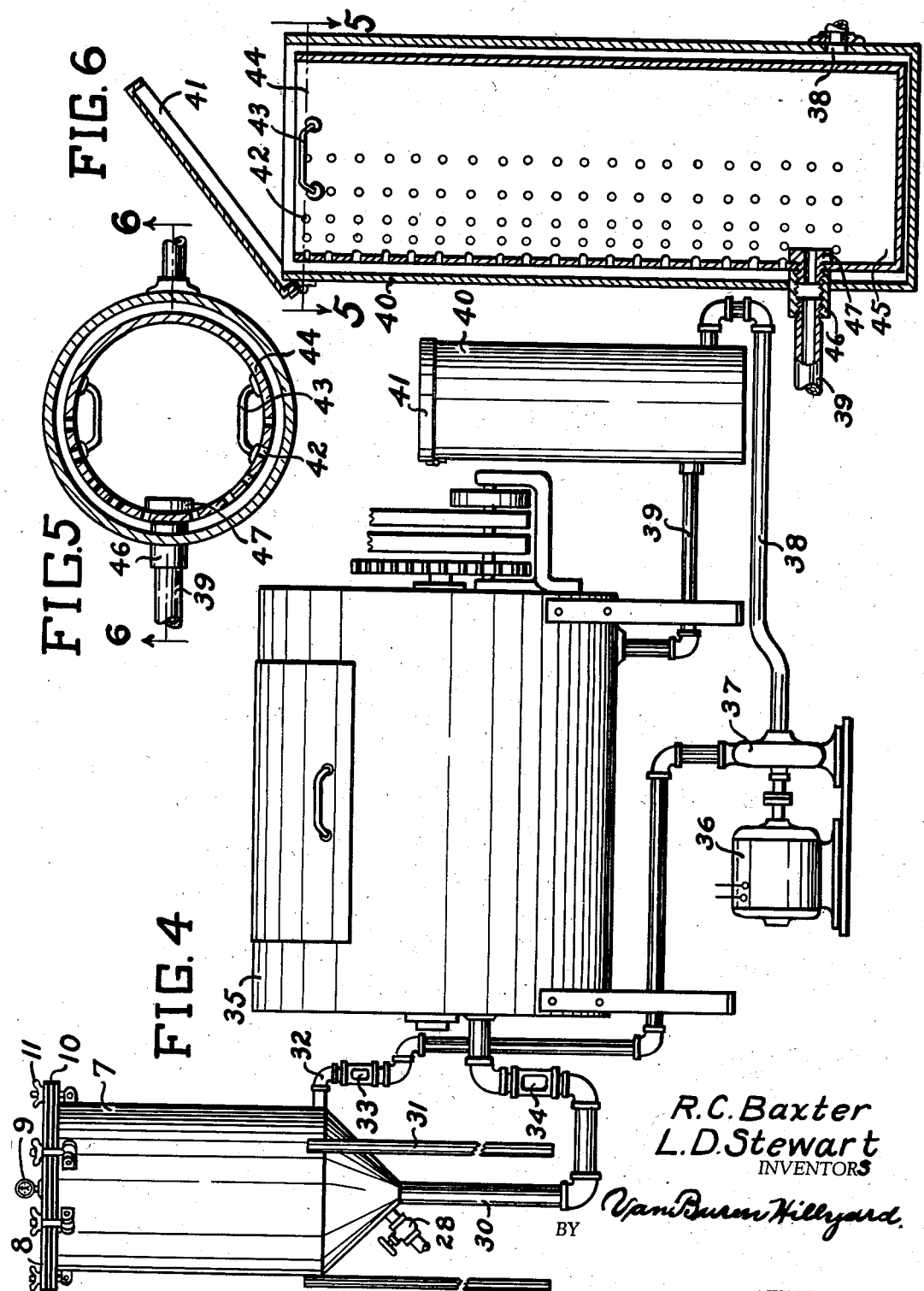

Patented Aug. 18, 1936

2,051,126

UNITED STATES PATENT OFFICE 2,051,126

NAPHTHA CLEANING PLANT

Richard C. Baxter and Leon D. Stewart, Electra, Tex.

Application January 3, 1935, Serial No. 282

3 Claims. (Cl. 210—134)

This invention has relation to apparatus for cleaning fluids and is designed more particularly to provide an appliance for purifying naphtha which is continuous in operation, the fluid being continuously circulated and the impurities separated therefrom in circuit.

The invention further provides an apparatus of the nature aforesaid which is compact, positive in operation, and readily accessible to facilitate renewals at a small cost.

The invention also contemplates a novel filter through which the fluid has a reverse circulation, upwardly and downwardly, whereby impurities are quickly removed, both by filtration and precipitation, and subsequently drawn off as desired.

The invention furthermore provides a filter having a bottom forming a chamber above which is disposed filtering media in layers, a pipe arranged to deliver the fluid to be cleaned in jets against the inclined sides of the said chamber, and a valved drain connected with the lower portion of the chamber to admit air to cause a gurgling action of the fluid in its passage through the filter.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 1 is a vertical section of the filter on the line 1—1 of Figure 2, showing portions of the circulatory pipe system.

Figure 2 is a plan section on the line 2—2 of Figure 1.

Figure 3 is a horizontal sectional view of the trap on the line 3—3 of Figure 1.

Figure 4 is a side view of a naphtha purifying plant illustrative of an embodiment of the invention.

Figure 5 is a plan section on the line 5—5 of Figure 6.

Figure 6 is a vertical section of the trap on the line 6—6 of Figure 5.

Corresponding and like parts are referred to in the following description and designated in the several views of the drawings by like reference characters.

The apparatus includes a washer 35 of approved type best suited for the particular use. A filter and a trap conveniently located, preferably with the washer 35 therebetween, are connected with the washer by a system of piping for circulating the naphtha or other fluid to be cleaned. This system includes pipes 30, 39, 32 and 38. A pump 37 connected with the pipes 32 and 38 causes positive circulation of the naphtha or other fluid through the washer, filter, and trap. A suitable motor 36 is connected with the pump 37 for operation thereof. The pipes 32 and 30 have sights 33 and 34 for conveniently observing the fluid circulating therethrough.

The filter consists of a shell or casing 7 having a conical bottom 29 and closed by a cover 8 fastened by bolts 11 and carrying a pressure gage 9. The pipe 30 connects with the apex of the conical bottom 29 and with the washer 35. A screen 25 is disposed within the lower portion of the shell 7 about in the plane of the juncture of the conical bottom 29 therewith. Cotton waste, or like material 24 is supported upon the screen 25. An annular pipe 26 is disposed beneath the screen 25 adjacent thereto and is provided in its bottom side with openings 27 for delivery of the fluid in jets against the upper portion of the conical bottom 29.

A filtering cartridge is located within the shell 7 and consists of a shell 18 having a conical bottom 23 and closed by a cover 14 secured by bolts 12 and provided with handles 13. The pipe 30 is extended and threaded to the apex of the conical bottom 23. A fine screen 22 resting upon the bottom 23 supports filtering media in layers 16, 17, 19, 20 and 21. The layer 21 consists of crushed charcoal, the layer 20 of diatomaceous earth, the layer 19 of a mixture of fuller's earth and darco, about half of each, the layer 17 of fuller's earth and the layer 16 of cotton waste tightly packed. The cartridge, being removable, may be renewed in whole or in part as occasion may require. Openings 15 are formed in the sides of the shell 18 near the top, for the inflow of fluid from the shell 18.

The trap consists of a shell 40 closed by a cover 41. A can 44 is disposed within the shell 40 and one side thereof is perforated throughout its extent, as indicated at 42, the other side being imperforate. Handles 43 applied to the can near the top thereof facilitate its handling. The perforated side 42 of the can 44 is arranged facing the connection of the pipe 39 with the shell 40 and can 44. The imperforate side of the can 44 is disposed opposite the side of the shell 40 to which the pipe 38 is attached.

The filter is usually supported on legs 31 and has a drain pipe 30ª coupled to the lower portion of the conical bottom 29. A valve 28 in the length of the drain pipe 30ª regulates the discharge of sediment or cuts off the discharge, as desired. It will be observed that the apparatus is compact, simple in arrangement, readily accessible for inspection, renewals and other purposes, and continuous in a cycle of operation since the fluid is positively circulated by means of the pump 37. In practice, it has been found advantageous to add a small amount of water to the diatomaceous layer of earth 20 to moisten it, whereby to absorb any water dye pigments in the naphtha and catch dust and foreign material held in solution.

It is assumed that the washer 35, filter 7, trap 40 and pipe system are filled with the naphtha to be cleaned. When operating the pump 37, the fluid is positively circulated and the impurities removed from the naphtha by the combined action of the filter, trap and washer. The fluid flows upwardly through the shell 7, thence through the openings 15 into and downwardly through the shell 18 and filtering media therein, thence through the pipe 30 into the washer and outwardly from the washer through the pipe 39 into the trap 40 back into the filter through the pipe 32. The fluid is delivered into the annular pipe 26 and is discharged in jets therefrom through the openings 27. These jets impinge against the converging sides of the bottom 29 with the result that foreign matter is separated and collects in the bottom to be drawn off as desired through the drain pipe 30ª. The fluid flows upwardly through the screen 25, cotton waste 24, and filtering media of the cartridge or shell 18 in the manner stated. The chamber formed by the conical bottom 29 is air tight and when the valve 28 is opened to drain sediment, air enters the filter and passes upwardly therethrough, causing a gurgling action and effecting a back wash which assists materially in separating the sediment from the cotton waste 24.

Having thus described the invention, what is claimed as new is:

1. Fluid cleaning apparatus comprising inner and outer shells having conical bottoms forming chambers, the outer shell having a lower inlet and the inner shell having a bottom outlet and a top inlet and spaced from the outer shell to admit of the fluid flowing upwardly through the outer shell, thence downwardly through the inner shell, screens within the shells supported above the bottoms thereof, cotton waste filtering material on the screen of the outer shell, filtering material in layers on the screen of the inner shell, said layers including charcoal, diatomaceous earth, a mixture of fuller's earth and darco, fuller's earth and cotton waste.

2. Fluid cleaning apparatus comprising an outer shell having a conical bottom forming a tapering chamber, with which a valved drain connects, a screen above the tapering chamber, a perforated annular inlet pipe below and adjacent the screen, cotton waste filtering material on the screen, a removable cartridge within the said outer shell and spaced therefrom and having a tapering bottom and an upper fluid inlet and an outlet pipe leading from the bottom of the inner shell through the bottom of the outer shell.

3. A filter comprising an outer shell having a conical bottom and closed by a removable cover, an inner shell having a tapering bottom, screens within the lower portion of the shells, filtering material supported on the screens, the filtering material in the inner shell being in layers and consisting of cotton waste, fuller's earth, darco and diatomaceous earth, an outlet pipe connected with the apex of the inner shell's bottom, an annular perforate pipe below and adjacent the screen of the outer shell to deliver the inflowing fluid in jets, and a valved drain connected with the lower portion of the conical bottom of the outer shell.

RICHARD C. BAXTER.
LEON D. STEWART.